United States Patent Office 2,882,271
Patented Apr. 14, 1959

2,882,271

PHARMACOLOGICALLY ACTIVE PIPERAZINE DERIVATIVES AND PROCESSES FOR PREPARING THEM

Paul Adriaan J. Janssen, Vosselaar, near Turnhout, Belgium, assignor to Laboratoriá Pharmaceutica Dr. C. Janssen N.V., Turnhout, Belgium, a limited-liability company of Belgium No Drawing. Application April 8, 1957
Serial No. 651,179

Claims priority, application Netherlands April 20, 1956

7 Claims. (Cl. 260—240)

This invention relates to new pharmacologically active piperazine derivatives and processes for preparing them.

It is known that several asymmetrically substituted piperazine derivatives possess an antihistaminic action. Some substituted benzohydryl-benzyl-piperazines show a very strong and long lasting antihistaminic action, and moreover in addition have a rather important sedative side effect. Consequently these compounds are also used as sedatives.

It is a principal object of this invention to provide compounds which possess antihistaminic and sedative action and which are low in toxicity. Another object of this invention is to separate the antihistaminic action from the sedative side-effect. This sedative side-effect can be useful in itself. Investigations were therefore made for antihistaminics having a minor sedative effect, as well as for sedatives having a minor antihistaminic action. It was found that strengthening or weakening of the sedative effect in relation to the antihistaminic action could be promoted with a certain group of piperazine derivatives in a simple manner.

It has now been found that compounds of the general formula:

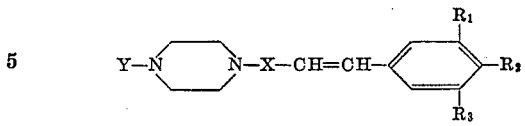

in which: Y represents a hydrogen atom or an aralkyl group, X represents a —CH$_2$— or a —CO— group, and R$_1$, R$_2$ and R$_3$ represent a hydrogen or a halogen atom or an alkoxy or alkyl group, containing not more than five carbon atoms, are active antihistaminics with a low sedative action if X represents a —CH$_2$— group, and strong sedatives with only a slight antihistaminic activity, if X represents a —CO— group.

Some of the antihistaminics possess a very strong activity, comparable with the activity of 1-p-chlorobenzohydryl-4-m-methyl-benzyl piperazine and/or have a very long lasting action. The sedative ketones possess a tranquillizing action on test animals, but give no rise to hypnosis, not even in the highest doses. By sedative action there is to be understood in the present specification inhibition of the spontaneous motility of test animals. In their action these ketones can best be compared with reserpine, the well known tranquillizing Rauwolfia, alkaloid. (This class of compounds is also known as tranquillizing agents.) The grade of the sedative action cannot be shown in numbers.

All of these compounds are very low in toxicity. A notable action can be obtained by administering only small fractions of the lethal dose (LD$_{50}$), these fractions being of the order of magnitude of 1/100. In the following table several of the compounds obtained according to the present invention are described with reference to the foregoing formula, together with their physical and pharmacological data.

Table

| No. | Y | X | R$_1$ | R$_2$ | R$_3$ | Salt | Melting point, degrees | Activity Ant. h. | Activity Sed. |
|---|---|---|---|---|---|---|---|---|---|
| 1 | H | CH$_2$ | H | H | H | Base | <20 (B.P. 191° at 18.5 mm. Hg) | + | + |
| 2 | H | CO | H | H | H | Base | 68 | + | ++ |
| 3 | COOC$_2$H$_5$ | CH$_2$ | H | t—C$_4$H$_9$ | H | do | 119 | 0 | + |
| 4 | C$_6$H$_5$—CH$_2$— | CO | H | t—C$_4$H$_9$ | H | do | 128-129 | + | ++ |
| 5 | C$_6$H$_5$—CH=CH— | CO | H | t—C$_4$H$_9$ | H | HCl | 250-255 | + | ++ |
| 6 | (C$_6$H$_5$)$_2$CH— | CO | H | H | H | Base | 168 | + | +++ |
| 7 | (C$_6$H$_5$)$_2$CH— | CH$_2$ | H | H | H | HCl | ¹192 | +++ | + |
| 8 | (C$_6$H$_5$)$_2$CH— | CO | H | Cl | H | Base | 140.5 | + | +++ |
| 9 | (C$_6$H$_5$)$_2$CH— | CH$_2$ | H | Cl | H | HCl | 160-162 | +++ | + |
| 10 | (C$_6$H$_5$)$_2$CH— | CO | H | t—C$_4$H$_9$ | H | Base | 183-185 | + | +++ |
| 11 | (C$_6$H$_5$)$_2$CH— | CH$_2$ | H | t—C$_4$H$_9$ | H | do | 130.5-133 | +++ | + |
| 12 | (C$_6$H$_5$)$_2$CH— | CO | H | OCH$_3$ | H | HCl | ¹221 | + | +++ |
| 13 | (C$_6$H$_5$)$_2$CH— | CH$_2$ | H | OCH$_3$ | H | Base | 126-132 | ++++ | + |
| 14 | (C$_6$H$_5$)$_2$CH— | CO | OCH$_3$ | OCH$_3$ | OCH$_3$ | do | 178-179.5 | + | +++ |
| 15 | p—Cl—C$_6$H$_4$ \| C$_6$H$_5$—CH— | CH$_2$ | H | H | H | HCl | 200-201 | +++ | + |
| 16 | p—Cl—C$_6$H$_4$ \| C$_6$H$_5$—CH— | CO | H | CH$_3$ | H | HCl | ¹150-153 | + | +++ |
| 17 | p—Cl—C$_6$H$_4$ \| C$_6$H$_5$—CH— | CH$_2$ | H | CH$_3$ | H | HCl | 177-178 | ++++ | + |
| 18 | p—Cl—C$_6$H$_4$ \| C$_6$H$_5$—CH— | CO | CH$_3$ | H | H | HCl | 155-173 | + | +++ |
| 19 | p—Cl—C$_6$H$_4$ \| C$_6$H$_5$—CH— | CH$_2$ | CH$_3$ | H | H | HCl | ¹176-200 | +++ | + |

See footnote at end of table.

Table—Continued

| No. | Y | X | R₁ | R₂ | R₃ | Salt | Melting point, degrees | Activity Ant. h. | Activity Sed. |
|---|---|---|---|---|---|---|---|---|---|
| 20 | p—Cl—C₆H₄<br>C₆H₅—ĊH— | CO | H | i—C₃H₇ | H | Base | 149.5 | + | +++ |
| 21 | p—Cl—C₆H₄<br>C₆H₅—ĊH— | CO | H | i—C₃H₇ | H | HCl | 153 | + | +++ |
| 22 | p—Cl—C₆H₄<br>C₆H₅—ĊH— | CH₂ | H | i—C₃H₇ | H | HCl | 164 | ++ | + |
| 23 | p—Cl—C₆H₄<br>C₆H₅—ĊH— | CO | H | t—C₄H₉ | H | Base | 170.5-171 | + | ++++ |
| 24 | p—Cl—C₆H₄<br>C₆H₅—ĊH— | CH₂ | H | t—C₄H₉ | H | HCl | 167-175 | ++ | + |
| 25 | p—Cl—C₆H₄<br>C₆H₅—ĊH— | CO | H | OCH₃ | H | Base | 131-133 | + | +++ |
| 26 | p—Cl—C₆H₄<br>C₆H₅—ĊH— | CH₂ | H | OCH₃ | H | HCl | 179-180 | ++ | + |
| 27 | p—CH₃—C₆H₄<br>C₆H₅—ĊH— | CO | H | t—C₄H₉ | H | Base | 144-145 | + | +++ |
| 28 | p—CH₃—C₆H₄<br>C₆H₅—ĊH— | CH₂ | H | t—C₄H₉ | H | HCl | 188-201 | ++ | + |
| 29 | p—i—C₃H₇—C₆H₄<br>C₆H₅—ĊH— | CO | H | t—C₄H₉ | H | Base | 169-172 | + | +++ |
| 30 | p—i—C₃H₇—C₆H₄<br>C₆H₅—ĊH— | CH₂ | H | t—C₄H₉ | H | HCl | ¹ 195-198 | ++ | + |
| 31 | p—CH₃O—C₆H₄<br>C₆H₅—ĊH— | CO | H | t—C₄H₉ | H | Base | 139-142 | + | +++ |
| 32 | p—CH₃O—C₆H₄<br>C₆H₅—ĊH— | CH₂ | H | t—C₄H₉ | H | HCl | 163-165 | ++ | + |
| 33 | p—CH₃O—C₆H₄<br>p—Cl—C₆H₄—ĊH— | CO | H | t—C₄H₉ | H | Base | 139 | + | +++ |
| 34 | p—CH₃O—C₆H₄<br>p—Cl—C₆H₄—ĊH— | CH₂ | H | t—C₄H₉ | H | HCl | 157-158 | ++ | + |
| 35 | p—CH₃—C₆H₄<br>p—Cl—C₆H₄—ĊH— | CO | H | t—C₄H₉ | H | Base | 100-102 | + | +++ |
| 36 | p—CH₃—C₆H₄<br>p—Cl—C₆H₄—ĊH— | CH₂ | H | t—C₄H₉ | H | HCl | 205-206 | ++ | + |
| 37 | p—i—C₃H₇—C₆H₄<br>p—Cl—C₆H₄—ĊH— | CO | H | t—C₄H₉ | H | Base | 158-160 | + | ++ |
| 38 | p—i—C₃H₇—C₆H₄<br>p—Cl—C₆H₄—ĊH— | CH₂ | H | t—C₄H₉ | H | HCl | 201-205 | ++ | + |

¹ Dec.

The compounds according to the invention can be prepared by reaction of piperazine with halides

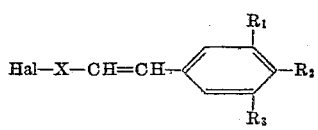

and Hal—Y in any desired sequence, in the presence of a hydrogen halide binding agent, the symbols Y, X, R₁, R₂ and R₃ having the meaning as hereinbefore defined, while Hal represents a halogen atom.

In the examples hereinafter given, only the second phase of the process is indicated, since the first phase proceeds in an analogous manner. It is, however, preferred to use an excess of piperazine in order to promote the formation of the once-substituted compound.

Further the compounds in which X represents a —CO— group, can be converted in a simple manner into the corresponding compounds, in which X represents a —CH₂— group, without attacking the double bond, by reduction with lithium aluminium hydride.

The invention is further explained by reference to the following examples:

Example 1

36.5 grams (0.165 mole) of 4-(tertiary butyl) cinnamoyl chloride in 400 cc. of dry benzene are mixed with 93 grams of 1-(4-chlorobenzohydryl) piperazine in 600 cc. of dry benzene and boiled for 30 minutes under reflux. The reaction mixture is left overnight at about 20° C. Thereafter the benzene is evaporated in a vacuum, the residue taken up in chloroform and washed with 50-200 cc. of a dilute aqueous hydrochloric acid solution. The unreacted 1-(4-chlorobenzohydryl) piperazine can be recovered from the aqueous layer obtained by making it alkaline.

The chloroform layer is washed with a dilute aqueous sodium hydroxide solution, thereafter with water, and is finally dried over potassium carbonate. The residue, which is obtained after evaporation of the chloroform, is dissolved by heating in a mixture of 25 percent of toluene and 75 percent of heptane. On cooling this solution to about 20° C. the 1-(4-tertiary butyl cinnamoyl)-4-(4-chlorobenzohydryl) piperazine precipitates. Yields are obtained of from 66 to 81 grams (70-86 percent). The melting point is 170.5-171° C., the ultraviolet spectrum in isopropanol shows a maximum at 287.5 mµ with an extinction of about 27,900. The calculated molecular weight is 473.04 ($C_{30}H_{33}N_2OCl$), whereas 478.6 and 477.2 was found. The chlorine content amounts to 9.50 percent (theoretically also 9.50 percent).

Example 2

To 0.04 mole of 1-(4-methyl cinnamoyl)-4-(4-chlorobenzohydryl) piperazine in 50 cc. of ether 0.03 mole of lithium aluminium hydride in 250 cc. of ether are slowly added. Thereby sufficient heat is produced to cause the ether to boil. After 30 minutes the mixture is heated so that boiling under reflux may continue for a few hours, after which the excess of lithium aluminium hydride is decomposed with water in which, preferably, some sodiumpotassiumtartrate is dissolved. After separation of the basic material with ether, the hydrochloride is formed in the well known way with hydrochloric acid gas, which hydrochloride is further purified by crystallization. The 1-(4-methyl cinnamyl)-4-(4-chlorobenzohydryl) piperazine hydrochloride is thus obtained.

All other reductions with lithium aluminium hydride are performed in an analogous manner. The yields amount to from 50-90 percent.

Example 3

A solution of 0.07 mole of 4-chlorobenzohydrylchloride and 0.14 mole of 1-cinnamyl piperazine in 500 cc. of toluene are boiled for 2 days, if desired in the presence of 0.15 mole of potassium carbonate. The toluene is evaporated and the residue extracted with ether, this solution is filtered and the ether evaporated. The residue obtained is extracted with acetone, which solution is saturated with hydrochloric acid gas. The hydrochloride of 1-cinnamyl-4-(4-chlorobenzohydryl) piperazine precipitates, is filtered and purified by recrystallization.

If desired the base can be purified directly by fractional distillation.

In this manner all compounds according to the invention can be prepared, and also those in which X=CO. The yields amount to from 60-85 percent.

What I claim is:

1. A compound of the structural formula

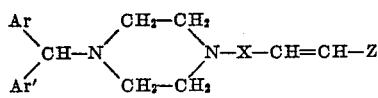

wherein Ar and Ar' are members of the class consisting of phenyl, methoxyphenyl, (lower alkyl)-phenyl and chlorophenyl groups, wherein X is a member of the class consisting of the methylene and carbonyl groups and wherein Z is a member of the class consisting of phenyl, chlorophenyl, (lower alkyl)-phenyl, methoxyphenyl and trimethoxyphenyl groups.

2. A compound of the structural formula

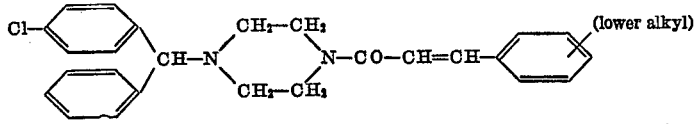

3. 1-(4-tertiary-butyl cinnamoyl)-4-(4-chlorobenzohydryl) piperazine.

4. A compound of the structural formula

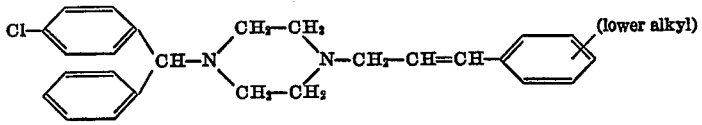

5. 1-(4-methoxy cinnamyl)-4-benzohydryl piperazine.
6. 1-cinnamyl-4-benzohydryl piperazine.
7. 1-(4-methyl cinnamyl)-4-(4-chlorobenzohydryl) piperazine.

References Cited in the file of this patent

UNITED STATES PATENTS 2,777,849    Bach et al. _____ Jan. 15, 1957

OTHER REFERENCES

Gaylord, N. G.: "Reduction With Complex Metal Hydrides," pages 124, 645; Interscience, New York (1956).
Papa et al.: J. Am. Chem. Soc., 72 (3885-6) (1950).